(12) United States Patent
Sharma et al.

(10) Patent No.: US 11,600,111 B2
(45) Date of Patent: Mar. 7, 2023

(54) SYSTEM AND METHOD FOR FACE RECOGNITION

(71) Applicant: Paralaxiom Technologies Private Limited, Bangalore (IN)

(72) Inventors: Kshitij Sharma, Bangalore (IN); Salil Manekar, Bangalore (IN)

(73) Assignee: Paralaxiom Technologies Private Limited

(*) Notice: Subject to any disclaimer, the term of this patent is extended or adjusted under 35 U.S.C. 154(b) by 80 days.

(21) Appl. No.: 17/315,443

(22) Filed: May 10, 2021

(65) Prior Publication Data
US 2021/0374385 A1 Dec. 2, 2021

(30) Foreign Application Priority Data

Jun. 1, 2020 (IN) .............................. 202041022972

(51) Int. Cl.
*G06V 40/16* (2022.01)
(52) U.S. Cl.
CPC .......... *G06V 40/168* (2022.01); *G06V 40/162* (2022.01); *G06V 40/172* (2022.01)
(58) Field of Classification Search
CPC .. G06V 40/168; G06V 40/162; G06V 40/172; G06V 40/50; G06V 10/82;
(Continued)

(56) References Cited

U.S. PATENT DOCUMENTS

| 2014/0063249 A1* | 3/2014 | Miller | G06V 20/56 382/104 |
| 2014/0267770 A1* | 9/2014 | Gervautz | H04N 5/23296 709/219 |

(Continued)

FOREIGN PATENT DOCUMENTS

| CN | 107491728 A | 12/2017 |
| CN | 110197128 A | 9/2019 |

OTHER PUBLICATIONS

A Face Recognition System Based on Cloud Computing and AI Edge for IOT; Junjie Zeng, Cheng Li, Liang-Jie Zhang; Jun. 16, 2018; https://link.springer.com/chapter/10.1007%2F978-3-319-94340-4_7; ResearchGate.

(Continued)

*Primary Examiner* — Nimesh Patel
(74) *Attorney, Agent, or Firm* — Jason C. Cameron

(57) ABSTRACT

A system and a method for face recognition are disclosed. The system also includes an image capturing subsystem configured to capture one or more images of faces. The system also includes a feature extraction subsystem configured to extract one or more features from the one or more images of faces. The system also includes a feature comparison subsystem configured to compare the one or more extracted features in a local database. The system also includes a feature transmission subsystem configured to transmit the one or more images and one or more extracted features to a remote server. The feature transmission subsystem is also configured to compare the one or more transmitted features to the one or more features pre-stored in the remote server. The system also includes a feature regeneration subsystem configured to regenerate the one or more matched features in the local database from the remote server.

8 Claims, 6 Drawing Sheets

(58) Field of Classification Search
CPC ...... G06V 10/70; G06V 10/776; G06V 20/20; G06V 20/52; G06V 40/113; G06V 40/19; G06N 20/00; G06N 3/02; G06N 3/126; G06N 7/005; G06N 3/08; G06N 3/0436; G06N 20/20; G06N 5/022; G06N 3/04; G06N 5/025; G06F 16/90344; G06F 3/016; G06F 3/0481; G06F 16/278; G06F 2221/2117; G06F 3/011; G06F 3/012; G06F 3/013; G06F 3/017; G06F 3/147; G06F 7/02; H04W 4/38; H04W 4/70; H04W 12/06; H04W 12/77; H04W 64/00; H04W 12/068; H04W 4/023; G06T 2207/20081; G06T 2207/20084; G06T 2207/30168; G06T 2207/10016; G06T 2207/30232; G06T 7/70; G06T 2207/10028; G06T 7/55

See application file for complete search history.

(56) References Cited

U.S. PATENT DOCUMENTS

| | | |
|---|---|---|
| 2015/0163448 A1* | 6/2015 | Khandpur .............. G06V 40/16 348/77 |
| 2017/0060574 A1 | 3/2017 | Malladi et al. |
| 2019/0278976 A1 | 9/2019 | Khadloya et al. |

OTHER PUBLICATIONS

An emotion recognition system based on edge computing and cloud computing applied in the kindergarten; Ruizhi Zhang, Chujie Tian, Yang Ji; https://dl.acm.org/doi/10.1145/3321408.3321596; May 2019.

* cited by examiner

SYSTEM AND METHOD FOR FACE RECOGNITION

EARLIEST PRIORITY DATE

This Application claims priority from a complete patent application filed in India having Patent Application No. 202041022972, filed on Jun. 1, 2020, and titled "SYSTEM AND METHOD FOR FACE RECOGNITION".

FIELD OF INVENTION

Embodiments of a present disclosure relate to a recognition system, and more particularly, to a system and a method for face recognition.

BACKGROUND

Many public places usually have surveillance cameras for video capturing and these cameras have their significant value for security purposes. It is widely acknowledged that the face recognition has played an important role in surveillance system. The actual advantages of face-based identification over other biometrics are uniqueness, acceptance and a touchless system. As human face is a dynamic object having a high degree of variability in its appearance, that makes face recognition a difficult problem in computer vision. Various face recognition systems are available to recognize the face of the user.

In a conventional approach, the system, which is available for face recognition, detects the face of the user by calling a cloud application programming interface (API) several times. However, such conventional approach costs a lot of money based on the cloud API call. Also, such approach incurs a network delay due to long network transmission latency. In another approach, the system uses deep learning for face recognition, where the features are extracted from the one or more images by using a deep learning technique. However, such approach suffers from lower accuracy as the edge computing resources are less powerful as compared to the cloud resources. Also, the local processing hardware system based on artificial intelligence technology is expensive.

Hence, there is a need for an improved system and a method for face recognition in order to address the aforementioned issues.

BRIEF DESCRIPTION

In accordance with an embodiment of the disclosure, a face recognition system is disclosed. The system includes one or more processors. The system also includes an image capturing subsystem operable by the one or more processors. The image capturing subsystem is configured to capture one or more images of faces of one or more users using an image capturing device. The system also includes a feature extraction subsystem operable by the one or more processors. The feature extraction subsystem is configured to extract one or more features from the one or more images of faces captured by the image capturing subsystem. The system also includes a feature comparison subsystem operable by the one or more processors. The feature comparison subsystem is configured to compare the one or more features extracted by the feature extraction subsystem with one or more features pre-stored in a local database.

The system also includes a feature transmission subsystem operable by the one or more processors. The feature transmission subsystem is configured to transmit the one or more images and one or more features extracted by the feature extraction subsystem to a remote server when the one or more features extracted by the feature extraction subsystem are absent in the local database. The feature transmission subsystem is also configured to compare the one or more features corresponding to the one or more images transmitted by the feature transmission subsystem to the one or more features pre-stored in the remote server to obtain one or more matched features for face recognition of the one or more users. The system also includes a feature regeneration subsystem operable by the one or more processors. The feature regeneration subsystem is configured to regenerate the one or more matched features corresponding to the one or more images in the local database from the remote server.

In accordance with another embodiment, a method for face recognition is disclosed. The method includes capturing one or more images of faces of one or more users using an image capturing device. The method also includes extracting one or more features from the one or more images of faces captured by the image capturing subsystem. The method also includes comparing the one or more features extracted by the feature extraction subsystem with one or more features pre-stored in a local database. The method also includes transmitting the one or more images and the one or more features extracted by the feature extraction subsystem to a remote server when the one or more features extracted by the feature extraction subsystem are absent in the local database. The method also includes comparing the one or more features corresponding to the one or more images transmitted by the feature transmission subsystem to the one or more features pre-stored in the remote server to obtain one or more matched features for face recognition of the one or more users. The method also includes regenerating the one or more matched features corresponding to the one or more images in the local database from the remote server.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
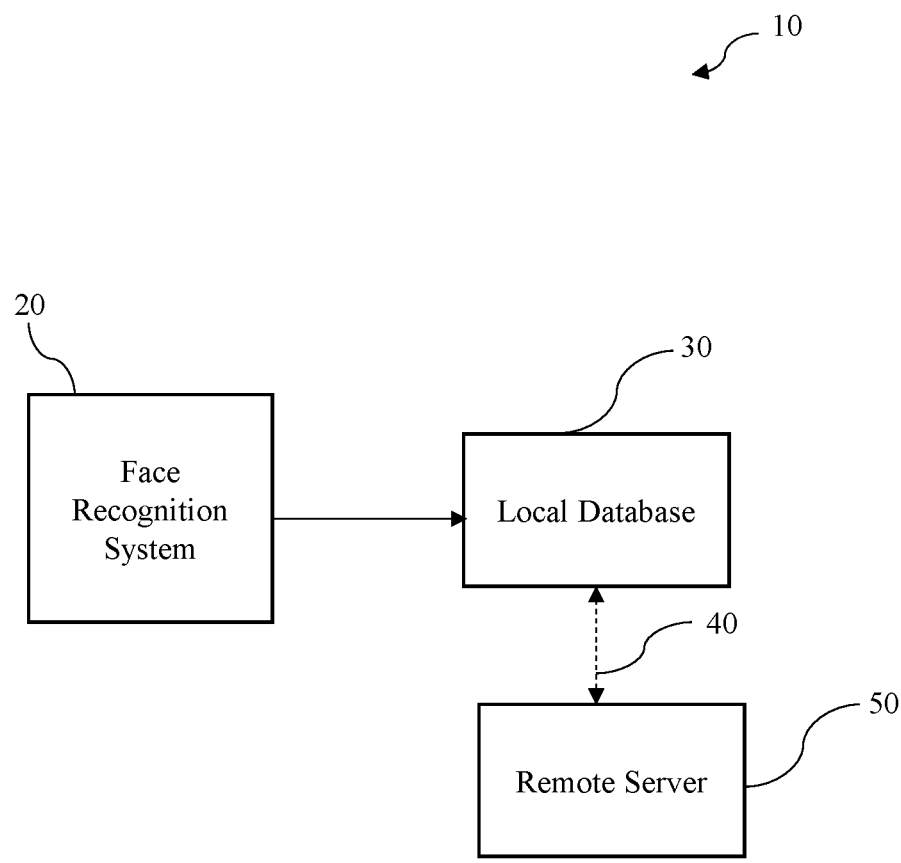
FIG. 1 is a schematic representation of a face recognition system in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for face recognition. The system includes one or more processors. The system also includes an image capturing subsystem operable by the one or more processors. The image capturing subsystem is configured to capture one or more images of faces of one or more users using an image capturing device. The system also includes a feature extraction subsystem operable by the one or more processors. The feature extraction subsystem is configured to extract one or more features from the one or more images of faces captured by the image capturing subsystem. The system also includes a feature comparison subsystem operable by the one or more processors. The feature comparison subsystem is configured to compare the one or more features extracted by the feature extraction subsystem with one or more features pre-stored in a local database.

The system also includes a feature transmission subsystem operable by the one or more processors. The feature transmission subsystem is configured to transmit the one or more images and the one or more features extracted by the feature extraction subsystem to a remote server when the one or more features extracted by the feature extraction subsystem are absent in the local database. The feature transmission subsystem is also configured to compare the one or more features corresponding to the one or more images transmitted by the feature transmission subsystem to the one or more features pre-stored in the remote server to obtain one or more matched features for face recognition of the one or more users. The system also includes a feature regeneration subsystem operable by the one or more processors. The feature regeneration subsystem is configured to regenerate the one or more matched features corresponding to the one or more images in the local database from the remote server.

FIG. 1 is a schematic representation of a face recognition system 10 in accordance of the present disclosure. A system 20 recognizes a face of a user by first comparing with one or more details available on a local database 30 and if the comparison does not succeed 40, then the system 20 calls a cloud application programming interface (API) for getting the one or more details from a remote server 50 to the local database 30 to recognize the face of the user.

Figure 2:
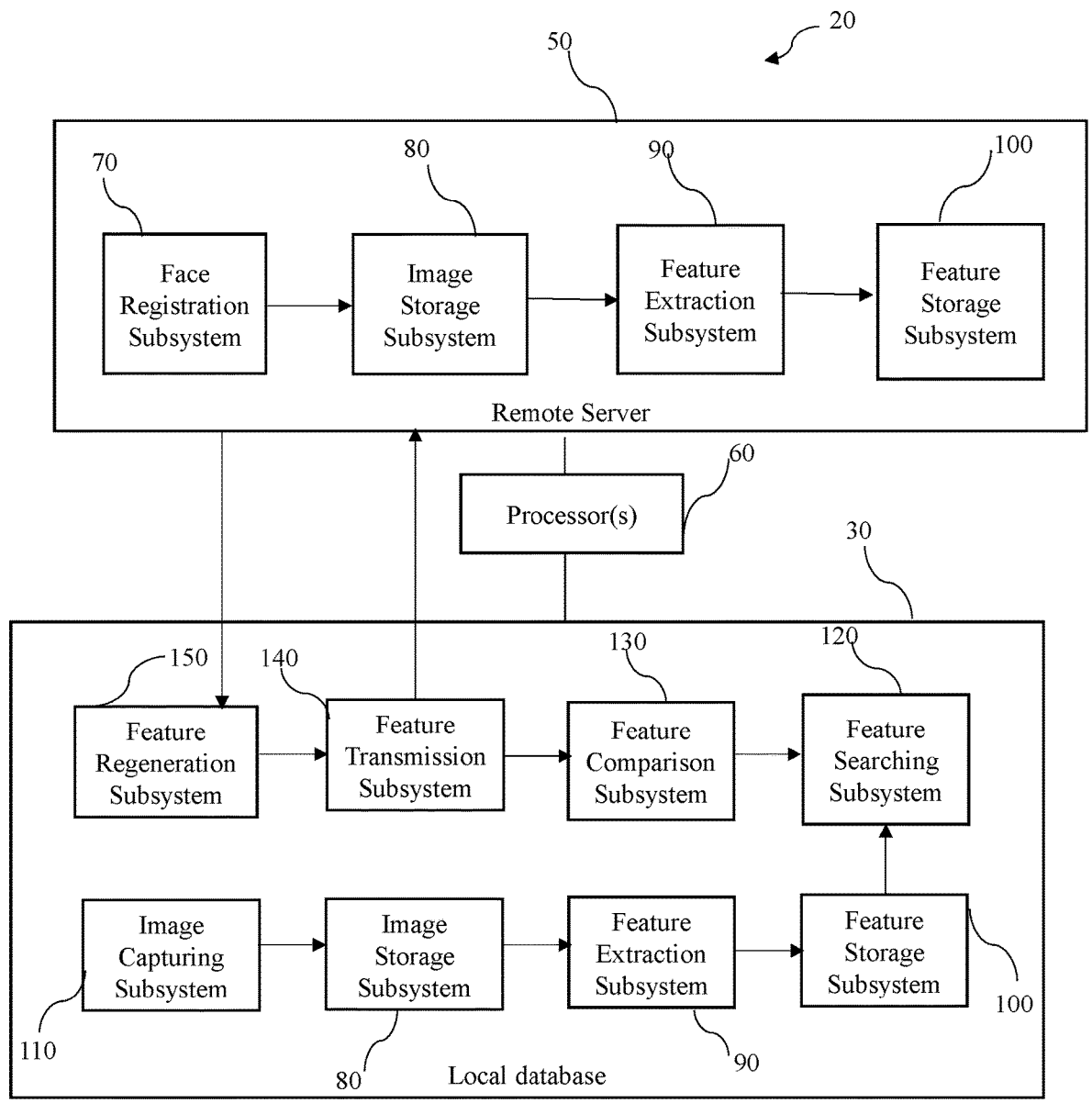
FIG. 2 is a block diagram representation of the face recognition system of FIG. 1 in accordance of the present disclosure.

FIG. 2 is a block diagram representation of a face recognition system 20 of FIG. 1 in accordance of the present disclosure. The system 20 includes one or more processors 60. In one embodiment, the system 20 may include a face registration subsystem 70 operable by the one or more processors 60. In such embodiment, the face registration subsystem 70 registers one or more images of faces of one or more users by capturing the one or more images of faces of the one or more users. In one embodiment, the one or more images of faces of the one or more users are captured by using an image capturing device. In such embodiment, the image capturing device may be installed within a computing device. In some embodiment, the computing device may include a hand-held device or a portable device. In such embodiment, the computing device may be a mobile phone, a tablet and the like.

In another embodiment, the image capturing device may include a surveillance camera. Further, in one embodiment, the system 20 may include an image storage subsystem 80 operable by the one or more processors 60. In such embodiment, the image storage subsystem 80 stores the one or more images of faces captured by the image capturing device on the remote server 50. In one embodiment, the remote server 50 may include a cloud-based storage and the one or more processors. In such embodiment, the one or more processors may include a combination of graphics processing unit (GPU), central processing unit (CPU) and the like. Further, in one specific embodiment, the system 20 may include a feature extraction subsystem 90 operable by the one or more processors 70. In such embodiment, the feature extraction subsystem 90 extracts one or more features of the one or more images of faces registered by the face registration subsystem 70 using a feature extraction technique to train an instance of the remote server 50. In one particular embodiment, the feature extraction technique may include, but not limited to, Principal Component Analysis (PCA), Fisher Linear Discriminant Analysis (FLD), Fast Pixel Based Matching (FPBM) and the like.

In one specific embodiment, the system 20 may include a feature storage subsystem 100 operable by the one or more processors 60. In such embodiment, the feature storage subsystem 100 stores the one or more features extracted by the feature extraction subsystem 90 corresponding to the one or more images of faces of the one or more users on the remote server 50. In some embodiment, the one or more features stored on the remote server 50 may be represented as one or more features pre-stored on the remote server 50. In such embodiment, the one or more features pre-stored on the remote server 50 acts as a historical data for one or more images of faces captured in the future.

Further, the system 20 includes an image capturing subsystem 110 operable by the one or more processors 60. The image capturing subsystem 110 captures the one or more images of faces of the one or more users using an image capturing device. In one embodiment, the image capturing device may include a video surveillance camera. In some embodiment, the image storage subsystem 80 stores the one or more images of faces captured by the image capturing subsystem 110 into a local database 30. In such embodiment, the local database 30 may include a local server, an on-premise edge device associated with the image capturing device, an immediate server and the like.

Furthermore, the feature extraction subsystem 90 extracts one or more features from the one or more images of faces captured by the image capturing subsystem 110 using one or more feature extraction techniques. In one particular embodiment, the feature extraction technique may include, but not limited to, Principal Component Analysis (PCA), Fisher Linear Discriminant Analysis (FLD), Fast Pixel Based Matching (FPBM) and the like. Further, in some embodiment, the feature storage subsystem 100 stores the one or more features extracted by the feature extraction subsystem 90 corresponding to the one or more images of faces in the local database 30.

In some embodiment, the system 20 may include a feature searching subsystem 120 operable by the one or more processors 60. The feature searching subsystem 120 searches the one or more features extracted by the feature extraction subsystem 90 in the local database 30 by looping through the one or more images of faces pre-stored in the local database 30. Further, the system 20 includes a feature comparison subsystem 130 operable by the one or more processors 60. The feature comparison subsystem 130 compares the one or more features extracted by the feature extraction subsystem 90 with one or more features pre-stored in the local database 30 to recognize the face of the one or more users.

Further, the system 20 also includes a feature transmission subsystem 140 operable by the one or more processors 60. The feature transmission subsystem 140 transmits the one or more images and the one or more features extracted by the feature extraction subsystem 90 to the remote server 50 by calling a cloud application programming interface (API) when the one or more features extracted by the feature extraction subsystem 90 are absent in the local database 30. Furthermore, the feature transmission subsystem 140 compares the one or more features corresponding to the one or more images transmitted by the feature transmission subsystem to the one or more features pre-stored in the remote server 50 to obtain one or more matched features for face recognition of the one or more users. In one embodiment, the comparison may be performed for fetching the face identity of the one or more users.

Further, the system 20 also includes a feature regeneration subsystem 150 operable by the one or more processors 60. The feature regeneration subsystem 150 regenerates the one or more matched features corresponding to the one or more images in the local database 30 from the remote server 50. In one embodiment, the feature regeneration subsystem 150 regenerates the one or more matched features in the local database 30 by fetching the one or more matched features from the remote server 50. Further, the feature storage subsystem 100 stores the one or more matched features regenerated by the feature regeneration subsystem 150 corresponding to the one or more images in the local database 30 for future use.

In one embodiment, the one or more features pre-stored in the local database 30 remains in the local database 30 for a certain interval of time. In some embodiment, the one or more features may be stored based on a pre-defined duration of time. In such embodiment, the pre-defined duration of time may include a pre-defined number of days, pre-defined number of months, pre-defined number of months, pre-defined number of years and the like. In one embodiment, time of the day-based features and images and environment-based features and images may also be stored in the local database 30. In such embodiment, the time of the day may include day, night, low light and the like.

Figure 3:
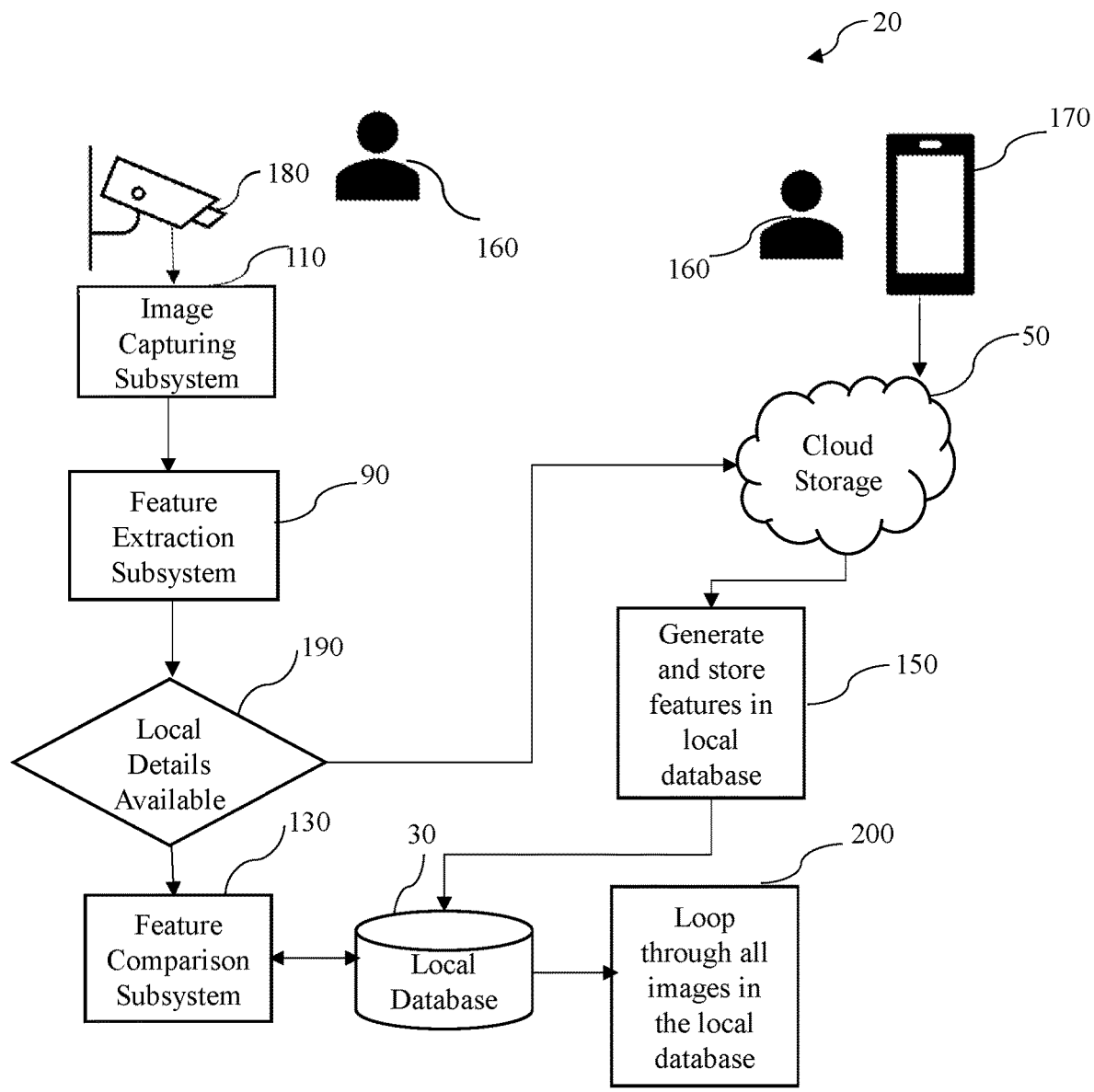
FIG. 3 is the block diagram of an embodiment of the face recognition system of FIG. 2 in accordance with an embodiment of the present disclosure.

FIG. 3 is a block diagram of an embodiment of the face recognition system 20 of FIG. 2 in accordance with an embodiment of the present disclosure. Assume, a face of a user 'X' 160 is registered, by the face registration subsystem 70, by capturing the face of the user 'X' 160 using a phone camera 170. Further, one or more geometric shaped features such as eyes, nose, mouth, and the like are extracted from a captured face of the user 'X' (160) by the feature extraction subsystem 90 to train an instance of cloud storage 50. Upon extraction of the one or more features, one or more extracted features are stored in cloud storage 50 for future use.

Further, to recognize the face of the user 'X' 160, a face image of the user 'X' 160 is captured, by the image capturing subsystem 110, using a surveillance camera 180. Upon capturing the face image of the user 'X' 160, the face image is stored in the on-premise edge device associated with the surveillance camera 180. Furthermore, the features of the user 'X' 160 are extracted, by the feature extraction subsystem 90 to check 190 whether the extracted features are available in the local database 30, wherein the system 20 loops through all the images of faces 200 present in the local database 30. Further, the comparison may be performed, by the feature comparison subsystem 130, to match the extracted features with one or more features pre-stored in the local database 30 to recognize the face of the user 'X' 160.

In such case, if the features of the user 'X' 160 are absent in the local database 30. Then, the features of the user 'X' 160 along with the face image of the user 'X' 160 are transmitted to the cloud-based storage 50, by the feature transmission subsystem 140, to obtain one or more matched features for face recognition of the user 'X' 160. Simultaneously, the local device is regenerated, by the feature regeneration subsystem 150, by the features of the user 'X' 160 corresponding to the face image of the user 'X' 160 by fetching the features from cloud-based storage 50.

Figure 4:
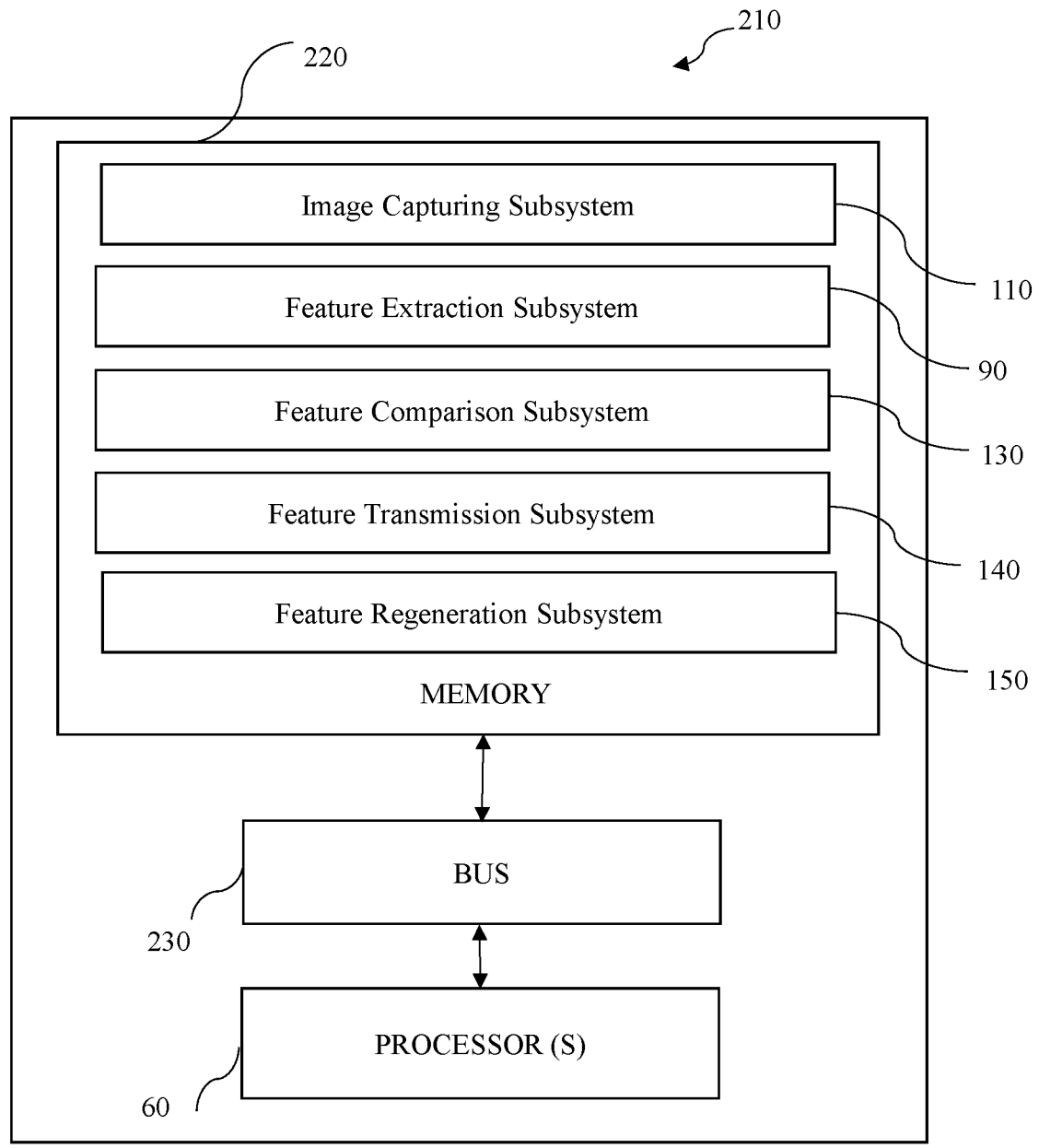
FIG. 4 is a block diagram of a face recognition computer system or a server in accordance with an embodiment of the present disclosure.

FIG. 4 is a block diagram of a face recognition computer system 210 in accordance with an embodiment of the present disclosure. The computer system 210 includes processor(s) 60, and memory 220 coupled to the processor(s) 60 via a bus 230. The processor(s) 60, as used herein, means a type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or other type of processing circuit, or a combination thereof.

Also, the memory 220, as used herein, is stored locally on a user device. The memory 220 includes multiple subsystems stored in the form of executable program which instructs the processor 60 to perform the configuration of the device illustrated in FIG. 2. The memory 220 has following subsystems: an image capturing subsystem 110, a feature extraction subsystem 90, a feature comparison subsystem 130, a feature transmission subsystem 140 and a feature regeneration subsystem 150 of FIG. 2.

Computer memory elements may include a suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on one of the above-mentioned storage media may be executable by the processor(s) 60.

The image capturing subsystem 110 instructs the processor(s) 60 to capture one or more images of faces of one or more users using an image capturing device. The feature extraction subsystem 90 instructs the processor(s) 60 to extract one or more features from the one or more images of faces captured by the image capturing subsystem. The feature comparison subsystem 130 instructs the processor(s) 60 to compare the one or more features extracted by the feature extraction subsystem with one or more features pre-stored in a local database.

The feature transmission subsystem 140 instructs the processor(s) 60 to transmit the one or more images and the one or more features extracted by the feature extraction subsystem to a remote server when the one or more features extracted by the feature extraction subsystem are absent in the local database. The feature transmission subsystem 140 instructs the processor(s) 60 to compare the one or more features corresponding to the one or more images transmitted by the feature transmission subsystem to the one or more features pre-stored in the remote server to obtain one or more matched features for face recognition of the one or more users. The feature regeneration subsystem 150 instructs the processor(s) 60 to regenerate the one or more matched features corresponding to the one or more images in the local database from the remote server.

Figure 5A:
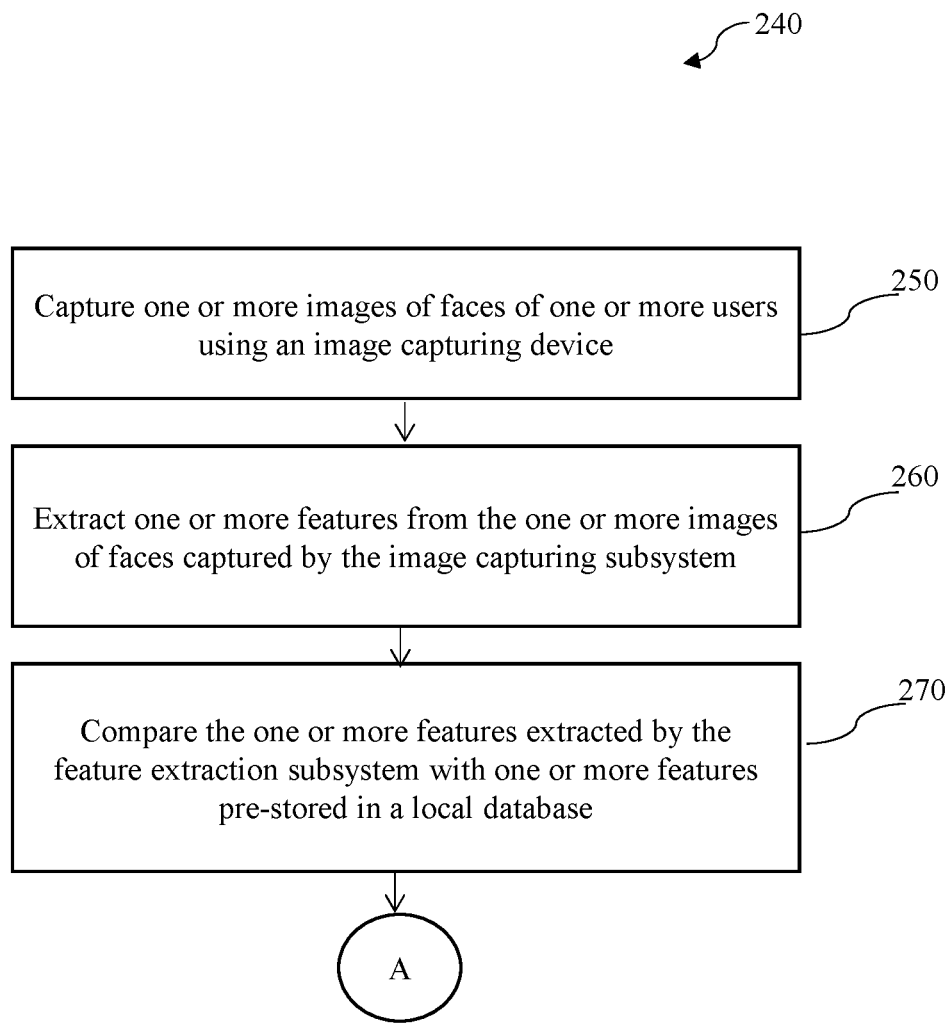
FIG. 5A and FIG. 5B are flow diagrams representing steps involved in a method for face recognition in accordance with an embodiment of the present disclosure.
Figure 5B:
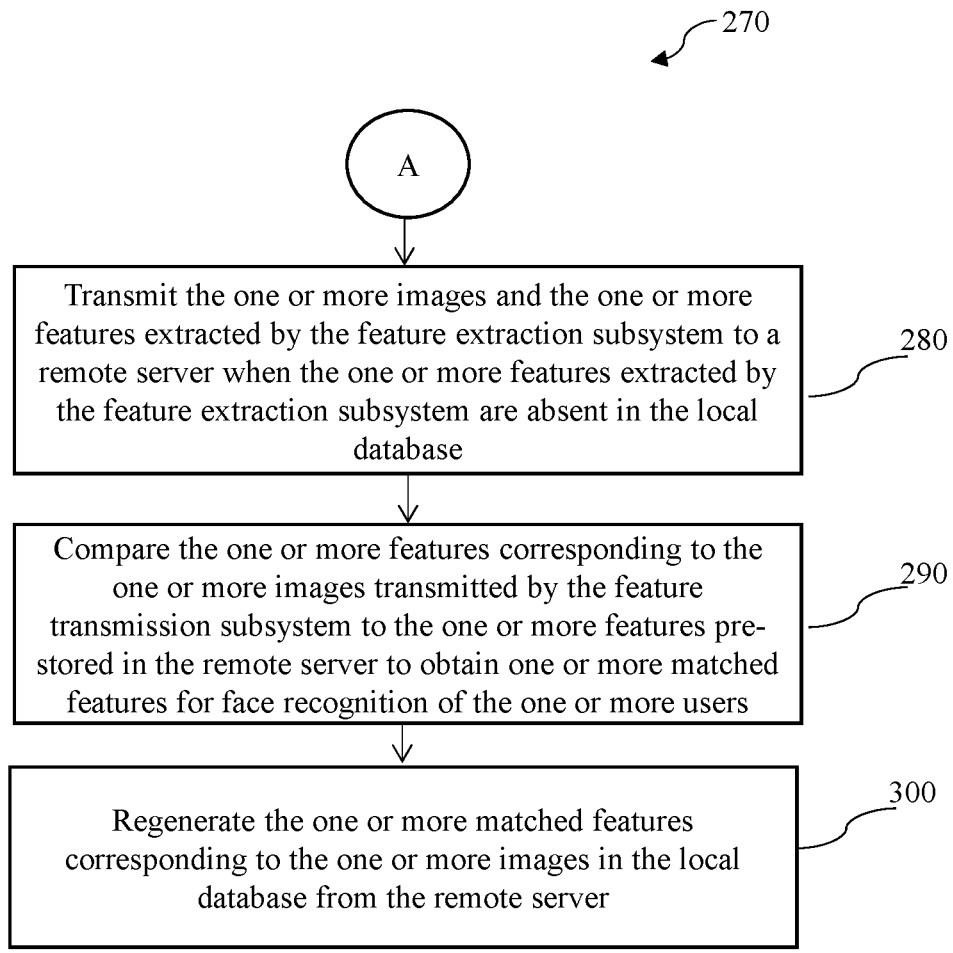

FIG. 5A and FIG. 5B are flow diagrams representing steps involved in a method 240 for face recognition in accordance with an embodiment of the present disclosure. In one embodiment, the method 240 may include registering, by a face registration subsystem, one or more images of faces of one or more users by capturing the one or more faces images of the one or more users. In one embodiment, capturing the one or more faces images of the one or more users may include capturing the one or more faces images of the one or more users by using an image capturing device. In such embodiment, capturing the one or more faces images of the one or more users by using the image capturing device may include capturing the one or more faces images of the one or more users by using a surveillance camera.

In one embodiment, the method 240 may include storing, by an image storage subsystem, the one or more images of faces captured by the image capturing device on a remote server. In one embodiment, storing the one or more images of faces captured by the image capturing device on the remote server may include storing the one or more images of faces captured by the image capturing device a cloud-based storage. Further, in one specific embodiment, the method 240 may include extracting, by a feature extraction subsystem, one or more features of the one or more images of faces registered by the face registration subsystem using a feature extraction technique. In such embodiment, extracting the one or more features of the one or more images of faces registered by the face registration subsystem using the feature extraction technique may include extracting the one or more features of the one or more images of faces registered by the face registration subsystem using a Principal Component Analysis (PCA), a Fisher Linear Discriminant Analysis (FLD), a Fast Pixel Based Matching (FPBM) and the like.

In one specific embodiment, the method 240 may include storing, by a feature storage subsystem, the one or more features extracted by the feature extraction subsystem corresponding to the one or more images of faces of the one or more users on the remote server. In some embodiment, the method 240 may include representing the one or more features stored on the remote server as one or more features pre-stored on the remote server.

Further, the method 240 includes capturing, by an image capturing subsystem, the one or more images of faces of the one or more users using an image capturing device in step 250. In some embodiment, the method 240 may include storing, by the image storage subsystem, the one or more images of faces captured by the image capturing subsystem into a local database. In such embodiment, storing the one or more images of faces captured by the image capturing subsystem into the local database may include storing the one or more images of faces captured by the image capturing subsystem into a local server, an on-premise edge device associated with the image capturing device, an immediate server and the like.

The method 240 also includes extracting, by the feature extraction subsystem, one or more features from the one or more images of faces captured by the image capturing subsystem using one or more feature extraction techniques in step 260. In one embodiment, extracting the one or more features from the one or more images of faces captured by the image capturing subsystem using the one or more feature extraction techniques may include extracting the one or more features from the one or more images of faces captured by the image capturing subsystem using Principal Component Analysis (PCA), Fisher Linear Discriminant Analysis (FLD), Fast Pixel Based Matching (FPBM) and the like. Further, in one embodiment, the method 240 may include storing, by the feature storage subsystem, the one or more features extracted by the feature extraction subsystem corresponding to the one or more images of faces in the local database.

In some embodiment, the method 240 may include searching, by a feature searching subsystem, the one or more features extracted by the feature extraction subsystem in the local database by looping through the one or more images of faces pre-stored in the local database. The method 240 also includes comparing, by a feature comparison subsystem, the one or more features extracted by the feature extraction subsystem with one or more features pre-stored in the local database to recognize the face of the one or more users in step 270.

The method 240 also includes transmitting, by a feature transmission subsystem, the one or more images or the one or more features extracted by the feature extraction subsystem to the remote server by calling a cloud application programming interface (API) when the one or more features extracted by the feature extraction subsystem are absent in the local database in step 280. The method 240 also includes comparing, by the feature transmission subsystem, the one or more features corresponding to the one or more images transmitted by the feature transmission subsystem to the one or more features pre-stored in the remote server to obtain one or more matched features for face recognition of the one or more users in step 290.

The method 240 also includes regenerating, by a feature regeneration subsystem, the one or more matched features corresponding to the one or more images in the local database from the remote server in step 300. In one embodiment, regenerating the one or more matched features corresponding to the one or more images in the local database may include regenerating the one or more matched features corresponding to the one or more images in the local database by fetching the one or more matched features from the remote server. The method 240 may also include storing, by the feature storage subsystem, the one or more matched features corresponding to the one or more images regenerated by the feature regeneration subsystem to the local database for future use.

In one embodiment, the method 240 may include pre-storing the one or more features in the local database for a certain interval of time. In some embodiment, the method 240 may include pre-storing the one or more features in the local database based on a pre-defined duration of time. In such embodiment, pre-storing the one or more features in the local database based on the pre-defined duration of time may include pre-storing the one or more features in the local database based on a pre-defined number of days, pre-defined number of months, pre-defined number of months, pre-defined number of years and the like. In one embodiment, the method may include storing time of the day-based features and images of faces and environment-based features and images of faces in the local database.

Various embodiments of the present disclosure provide a technical solution to the problem of face recognition. The present disclosure provides an efficient system to recognize the face of the user by combining on-premise edge computing resources and cloud inferencing methods which in turn improves the accuracy of the system as result obtained only by the premise edge computing resources are not always as accurate. Also, the present system reduces the cost of face recognition by eliminating the need to access cloud storage several times. Moreover, the present system stores time-based and duration-based images for debugging and accuracy purposes.

While specific language has been used to describe the disclosure, limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of a flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A face recognition system (20) comprising:
one or more processors (60);
an image capturing subsystem (110) operable by the one or more processors (60), wherein the image capturing subsystem (110) is configured to capture one or more images of faces of one or more users using an image capturing device;
a feature extraction subsystem (90) operable by the one or more processors (60), wherein the feature extraction subsystem (90) is configured to extract one or more features from the one or more images of the faces captured by the image capturing subsystem (110) and store in a local database, wherein the extraction of the one or more features from the one or more images of faces captured by the image capturing subsystem comprises of using at least one of Principal Component Analysis (PCA), Fisher Linear Discriminant Analysis (FLD), Fast Pixel Based Matching (FPBM), wherein the local database stores time of the day-based features and images and environment-based features and images, and wherein the one or more features pre-stored in the local database remains in the local database for a certain interval of time;
a feature comparison subsystem (130) operable by the one or more processors (60), wherein the feature comparison subsystem (110) is configured to compare the one or more features extracted by the feature extraction subsystem (90) with one or more features pre-stored in the local database;
a feature transmission subsystem (140) operable by the one or more processors (60), wherein the feature transmission subsystem (140) is configured to:
transmit the one or more images and the one or more features extracted by the feature extraction subsystem (90) to a remote server when the one or more features extracted by the feature extraction subsystem (90) are absent in the local database, and
compare the one or more features corresponding to the one or more images transmitted by the feature transmission subsystem (140) to the one or more features pre-stored in the remote server to obtain one or more matched features for face recognition of the one or more users; and
a feature regeneration subsystem (150) operable by the one or more processors (60), wherein the feature regeneration subsystem (150) is configured to regenerate the one or more matched features corresponding to the one or more images in the local database from the remote server.

2. The system (20) as claimed in claim 1, wherein the local database comprises an on-premise edge computing device associated with the image capturing device.

3. The system (20) as claimed as claim 1, wherein the remote server comprises cloud-based storage and one or more processors.

4. The system (20) as claimed as claim 1, comprising a feature storage subsystem configured to store the one or more matched features regenerated by the feature regeneration subsystem to the local database.

5. A method (240) for face recognition, the method (240) comprising:
capturing, by an image capturing subsystem, one or more images of faces of one or more users using an image capturing device (250);

extracting, by a feature extraction subsystem, one or more features from the one or more images of faces captured by the image capturing subsystem (260);

storing, by an image storage subsystem, the one or more images of faces captured by the image capturing subsystem into a local database;

extracting, by the feature extraction subsystem, the one or more features from the one or more images of faces captured by the image capturing subsystem (260) using the one or more feature extraction techniques comprises of extracting the one or more features from the one or more images of faces captured by the image capturing subsystem using Principal Component Analysis (PCA), Fisher Linear Discriminant Analysis (FLD), Fast Pixel Based Matching (FPBM);

pre-storing the one or more features in the local database comprises of pre-storing the one or more features in the local database for a certain interval of time;

comparing, by a feature comparison subsystem, the one or more features or one or more images extracted by the feature extraction subsystem with one or more features pre-stored in the local database (270);

transmitting, by a feature transmission subsystem, the one or more images and the one or more features extracted by the feature extraction subsystem to a remote server when the one or more features extracted by the feature extraction subsystem are absent in the local database (280);

comparing, by the feature transmission subsystem, the one or more features corresponding to the one or more images transmitted by the feature transmission subsystem to the one or more features pre-stored in the remote server to obtain one or more matched features for face recognition of the one or more users (290); and regenerating, by a feature regeneration subsystem, the one or more matched features corresponding to the one or more images in the local database from the remote server (300).

6. The method (240) as claimed as claim 5, wherein pre-storing the one or more features in the local database may include pre-storing the one or more features in an on-premise edge computing device associated with the image capturing device.

7. The method (240) as claimed as claim 5, wherein transmitting the one or more features extracted by the feature extraction subsystem to the remote server comprises transmitting the one or more features extracted by the feature extraction subsystem to cloud-based storage and one or more processors.

8. The method (240) as claimed as claim 5, comprising storing, by a feature storage subsystem, the one or more matched features regenerated by the feature regeneration subsystem to the local database.

* * * * *